(12) United States Patent
Brewington

(10) Patent No.: US 7,078,827 B2
(45) Date of Patent: Jul. 18, 2006

(54) TIDAL GENERATOR SYSTEM AND METHOD

(76) Inventor: Doyle W. Brewington, 6503 Bayonne Dr., Northampton, Spring, TX (US) 77389

( * ) Notice: Subject to any disclaimer, the term of this patent is extended or adjusted under 35 U.S.C. 154(b) by 0 days.

(21) Appl. No.: 10/677,275

(22) Filed: Oct. 3, 2003

(65) Prior Publication Data

US 2005/0073153 A1 Apr. 7, 2005

(51) Int. Cl.
  F03B 13/12  (2006.01)
  F03B 13/10  (2006.01)

(52) U.S. Cl. .............. 290/53; 290/42; 290/43; 417/330

(58) Field of Classification Search ............. 290/42, 290/43, 54, 53; 417/330, 331
See application file for complete search history.

(56) References Cited

U.S. PATENT DOCUMENTS

| | | | |
|---|---|---|---|
| 3,668,412 A * | 6/1972 | Vrana et al. ........... | 290/53 |
| 3,925,986 A * | 12/1975 | Barwick ................ | 60/398 |
| 4,103,490 A * | 8/1978 | Gorlov ................. | 60/398 |
| 4,288,985 A * | 9/1981 | Dyck ................... | 60/398 |
| 5,186,822 A * | 2/1993 | Tzong et al. ........... | 210/122 |
| 5,374,850 A * | 12/1994 | Cowen ................. | 290/53 |
| 5,512,787 A * | 4/1996 | Dederick .............. | 290/4 R |
| 5,872,406 A * | 2/1999 | Ullman et al. .......... | 290/53 |
| 6,388,342 B1 * | 5/2002 | Vetterick et al. ........ | 290/53 |
| 6,666,024 B1 * | 12/2003 | Moskal ................ | 60/641.7 |
| 6,800,954 B1 * | 10/2004 | Meano ................. | 290/53 |
| 6,849,963 B1 * | 2/2005 | Grinsted et al. ......... | 290/42 |
| 6,863,806 B1 * | 3/2005 | Stark et al. ............ | 210/170 |

* cited by examiner

Primary Examiner—Nicholas Ponomarenko
(74) Attorney, Agent, or Firm—Fleshner & Kim LLP

(57) ABSTRACT

A tidal generator system is provided that includes a containment tank, and a ring mechanism provided about the containment tank to rise and fall based on tidal actions. A valve mechanism allows a liquid to pass into the containment tank. Additionally, a turbine/generator system generates electrical energy based on the liquid passing through the valve mechanism.

19 Claims, 6 Drawing Sheets

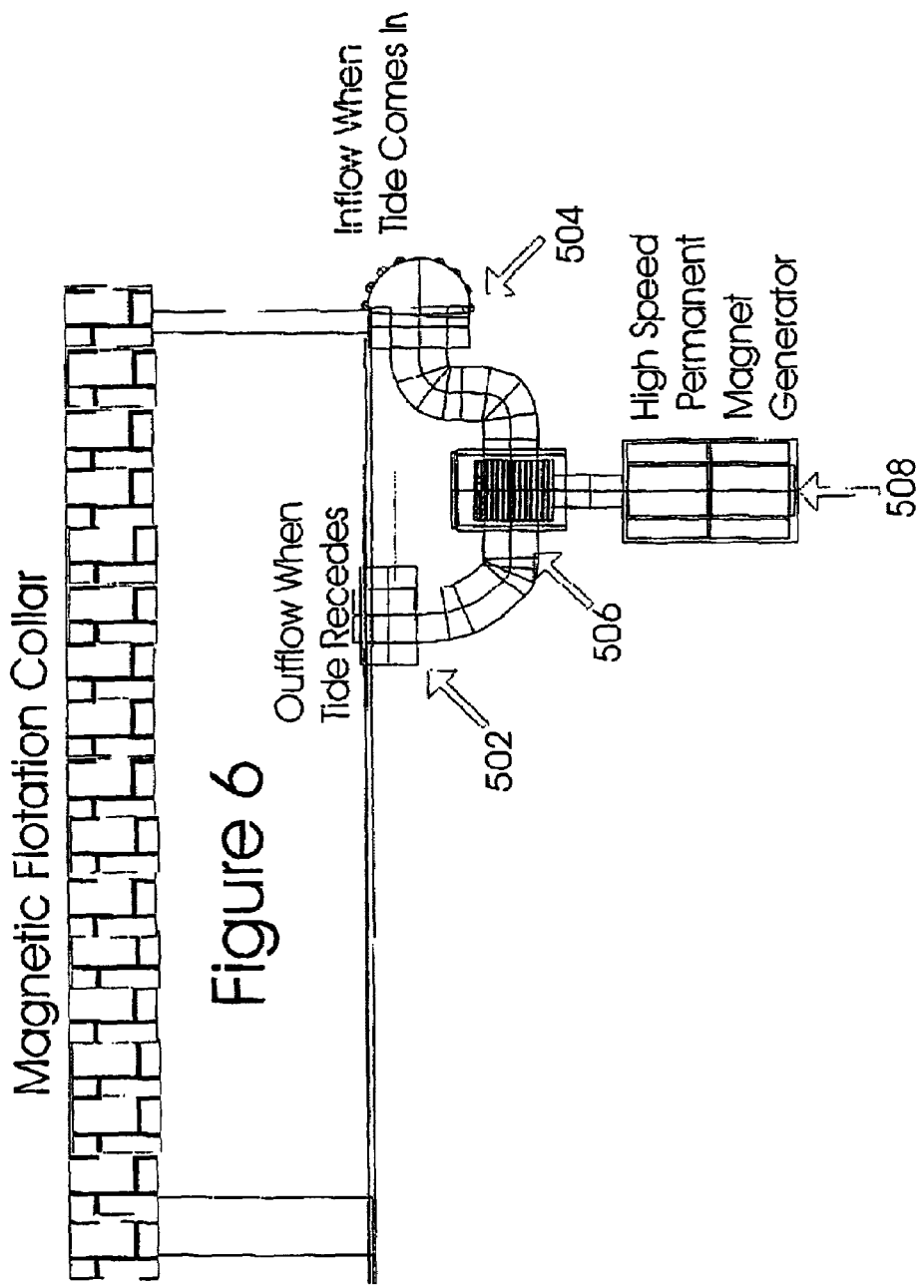

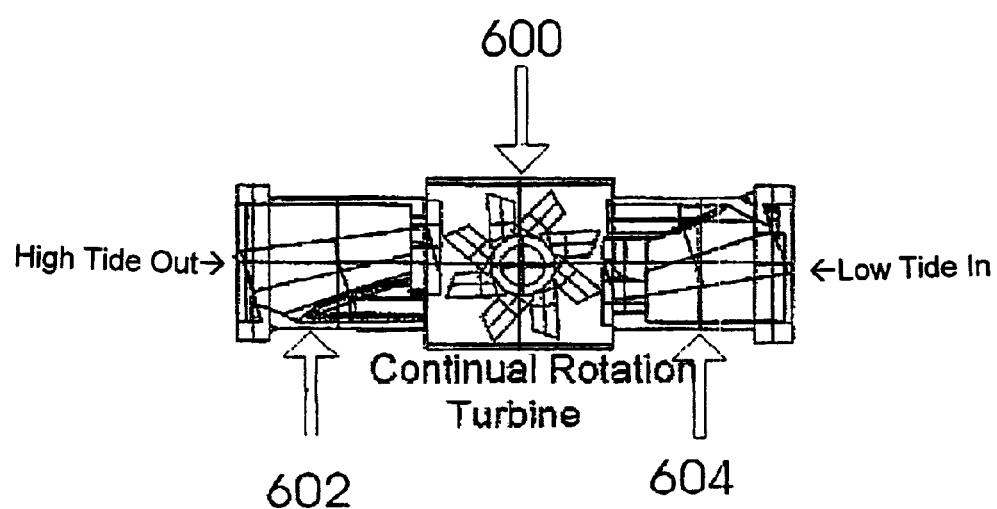

TIDAL GENERATOR SYSTEM AND METHOD

FIELD OF THE INVENTION

Embodiments of the present invention may relate to electrical power generation. More particularly, embodiments of the present invention may relate to electrical power generation using tidal actions of bodies of water, such as the sea.

BACKGROUND OF RELATED ART

Tidal actions of the oceans, seas, rivers and lakes may be used as a source of energy (i.e., electrical power generation). However, systems using tides as a source of energy are massive systems that, if implemented, may create impediments to water surface travel. Additionally, these systems may be problematic due to destruction of marine life through entanglement or entrapment of marine fauna and flora and therefore may not be conducive to safe environmental power generation. These systems may also incur high maintenance costs and high installation cost.

Some systems may be merely turbines provided in an open environment. Systems may have very long walls that require ground anchoring in the sea floor. Systems may also have floatation systems containing small turbines while encompassing massive areas making the area where they are installed no longer usable for anything else. Additionally, many systems may not take into account the extreme tidal conditions and in many cases can only be installed in major tidal areas that have large differentials between the high tide and the low tide. Additionally, tidal generators may have a lead and lag power supply time between the time they reach a peak of the high tide and a peak of the ebb tide. During these periods of time, these tidal generators may not generate any power. Additionally, due to the large structures required for these systems, the overall cost of power installation may be $2 million to $2.5 million per installed Megawatt, for example.

SUMMARY OF THE INVENTION

Embodiments of the present invention may provide an apparatus and method for producing electrical energy from the action of tides created by the differential in gravitational fields between the Earth and the moon. The apparatus and method may overcome problems of disadvantageous systems.

Embodiments of the present invention may provide a means to take into consideration the variety of tidal conditions around the planet Earth.

Embodiments of the present invention may provide a method to incorporate various levels of tides at given points in a chosen tidal area over a period of time.

Embodiments of the present invention may provide a tidal generator system in a modular configuration specifically designed for the area of installation and the quantity of power that is to be produced.

Embodiments of the present invention may provide a non-stop power generating capability in modular form without regard to high tide or ebb tide pauses. This may be provided by use of a delay mechanism that starts approximately five hours, for example, after a primary unit has started to rise thereby creating a delayed electrical reserve to work during tidal transition periods and again to lower in the opposite direction also with a given time delay.

Embodiments of the present invention may provide a very low "installed cost" power generating unit while providing zero (or relatively zero) fuel cost electricity.

Embodiments of the present invention may provide a system that is totally transportable for lower power unit designs, and that is rapidly assembled and modularly transportable for higher power unit designs.

Embodiments of the present invention may provide a system that is easily serviced in case of component failure.

Embodiments of the present invention may be installed inland on a beach, beyond a wave line and/or enclosed in a prepared tidal activated basin.

Embodiments of the present invention may allow the tidal generator to operate either on its own or in series with other tidal generators. This allows for uninterrupted service over an indefinite period of time as well as a greater amount of total electrical power.

Embodiments of the present invention may provide activation and control of a self leveling device upon receipt of a signal from a broadcast station (e.g., NOAA or a private system) that broadcasts a continual signal indicating tidal minimums on any given day. The self leveling system of the tidal generator may adjust at that minimum level for that given day's tide thereby enabling a magnetic floatation ring to rise a full vertical distance of a containment tank.

Other objects, advantages and salient features of the invention will become apparent from the following detailed description taken in conjunction with the annexed drawings, which disclose preferred embodiments of the invention.

BRIEF DESCRIPTION OF DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only, and that the invention is not limited thereto.

Arrangements and embodiments of the present invention may be described with reference to the following drawings in which like reference numerals represent like elements and wherein:

FIG. 6 is a close-up view of pumping, turbine and generator devices according to an example embodiment of the present invention; and FIG. 7 is a close-up view of a turbine section according to an example embodiment of the present invention.

DETAILED DESCRIPTION OF PREFERRED EMBODIMENTS

Embodiments of the present invention may provide a system to supply electrical energy by harnessing action of the sea tides in accordance with gravitational exertion that may exist between the Earth and the moon at given periods of time in given parts of the world. Embodiments of the present invention may hereinafter also be referred to as a Hydro-Pneumatic Tidal Generator System or tidal generator system. The tidal generator system may be designed to operate continually. The tidal generator system may be silent, non-polluting, and installed in a specifically prepared area.

Figure 1:
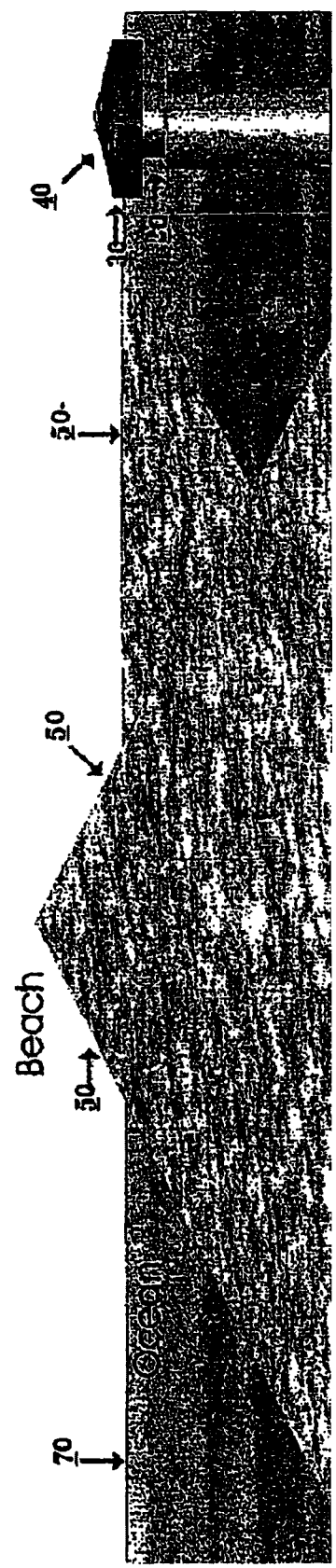
FIG. 1 shows an installation of an example embodiment of the present invention.

FIG. 1 shows an installation of an example embodiment of the present invention. Other installation sites and embodiments are also within the scope of the present invention. More specifically, FIG. 1 shows an installation site of the Hydro-Pneumatic Tidal Generator System (or hereafter the tidal generator system) that is protected by a sand barrier (or other barrier) so as to prevent wave action interference.

Embodiments of the Hydro-Pneumatic Tidal Generator System may include a base 10 built of concrete or non-rusting metal, for example, to support the remainder of the tidal generator system. An automatic stabilizer and leveler control housing 20 may be provided on the base 10, and a main tank 30 may be provided above the housing 20. Additionally, a stress support system 40 may be provided on the main tank 30 over the automatic stabilizer and leveler control housing 20.

FIG. 1 also shows a beach 50 or other type of protective configuration, including, but not limited to, a mechanical barrier. The beach 50 may separate an internal oceanic water area 60 from the open ocean area 70. The internal oceanic water area 60 may rise and fall at a same rate as the ocean area 70.

Figure 2:
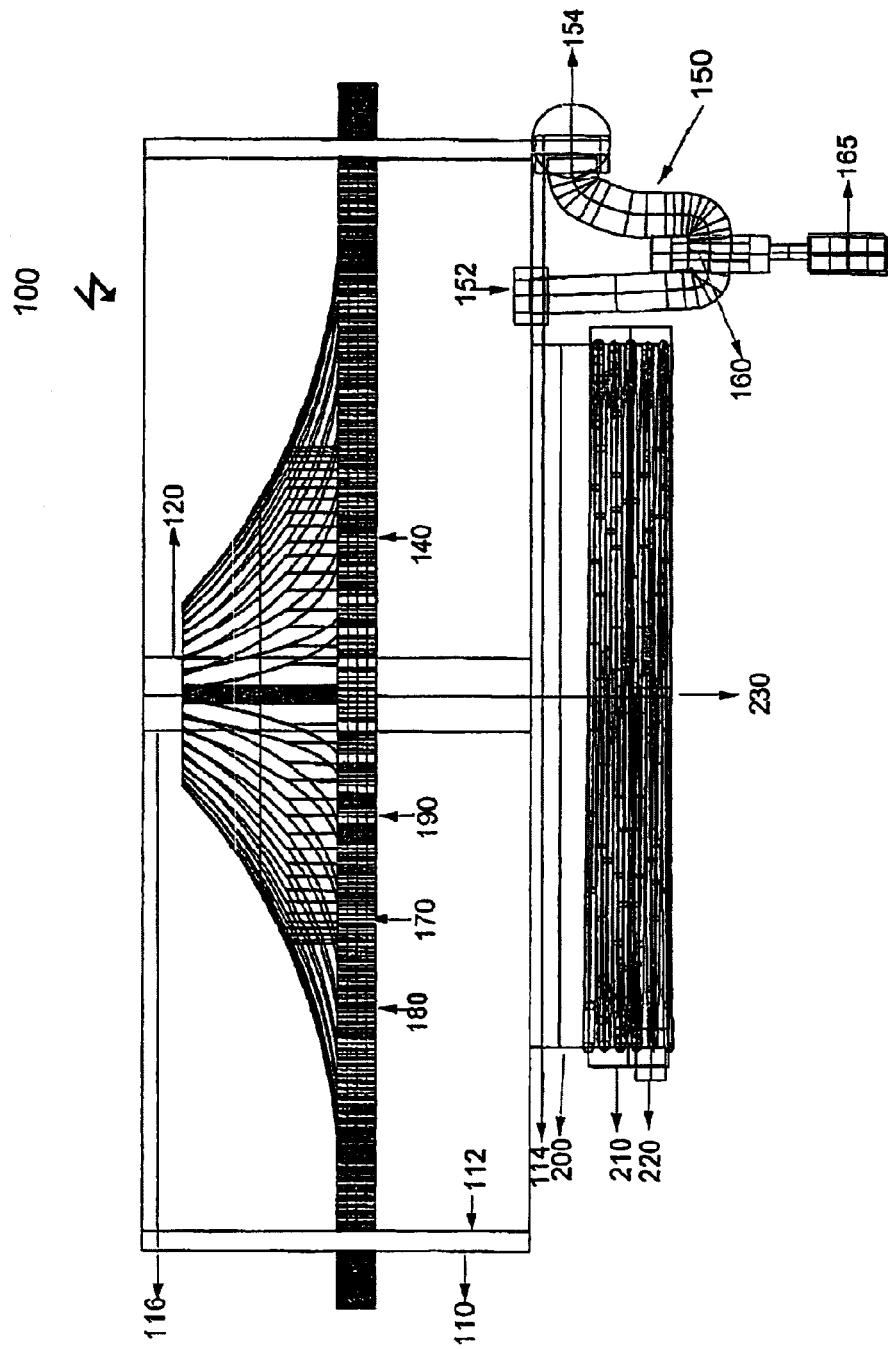
FIG. 2 is a side view of a tidal generator system according to an example embodiment of the present invention.

The base 10 made of concrete or non-corroding metal, for example, may be inserted into a protected tidal area 60. The tidal generator system may be seated and anchored on the base 10. In at least one embodiment, the tidal generator system may include five modules inserted inside, outside or below a main containment tank (FIG. 2). That is, several joined modular units may be joined together to produce increasing amounts of power and/or maintain uniformity of continuous power output regardless of a tidal position at any given time.

FIG. 2 is a side view of a tidal generator system 100 according to an example embodiment of the present invention. Other embodiments and configurations are also Within the scope of the present invention. More specifically, FIG. 2 shows a containment tank 110 having side walls 112. The tidal generator system 100 may operate between a lower tidal mark 114 and an upper tidal mark 116 of the containment tank 110. A positioning guide pole 120 may be provided at a center location, for example, of the containment tank 110. This positioning guide pole 120 may be provided in higher capacity power units, for example. A molded stress support 130 and a piston plate diaphragm 140 may be provided around the positioning guide pole 120. The piston plate diaphragm 140 may be attached to the stress support 130.

The tidal generator system 100 may also include a valve mechanism (or valve system) 150 having an out-flow side 152 and an in-flow side 154. A high-speed permanent magnet turbine 160 may be coupled to the valve mechanism 150 and may or may not be considered part of the valve mechanism 150. As will be described below, the turbine 160 may be coupled to a high-speed permanent generator 165. Water passing through the valve mechanism 150 turns the turbine 160, which in turn allows the generator 165 to generate electrical energy.

FIG. 2 further shows a perimeter of a magnetic floatation collar (or ring) 170. A neodymium magnet belt 180 may be composed of simple blocks of the material. A center magnetic block array 190 may be used in larger power capacity units to support the center of the piston plate diaphragm 140.

A self-stabilizing leveler system may include an upper half 200 and a lower half 210. A leveler control hydraulic shock support coil 220 and a hydraulic leveler control shock support coil housing 230 may also be provided.

The containment tank 110 may be surrounded by the water proof magnetic ring 170 (as floatation ring) that contains a plurality of powerful neodymium magnets in block form. The ring 170 may be buoyancy positive and free to ride up and down the exterior of the containment tank 110 based on the rise and fall of the tides. The containment tank 110 may be based on tidal conditions of the area in which the tidal generator is going to be located. For example, tides off the coast of Maine are normally much greater than tides along the Gulf Coast. Defining the configuration of the containment tank 110 may require the same volume for a given power requirement but in different geometrical configurations. A greater tide differential may allow the containment tank 110 to have a smaller diameter but a greater height configuration, whereas a lower tidal differential may make the containment tank 110 of greater diameter but of lower height to match the highest and lowest points of the tidal location. In either case, the total volume of the containment tank 110 in any configuration may be based on desired power requirements.

Figure 3:
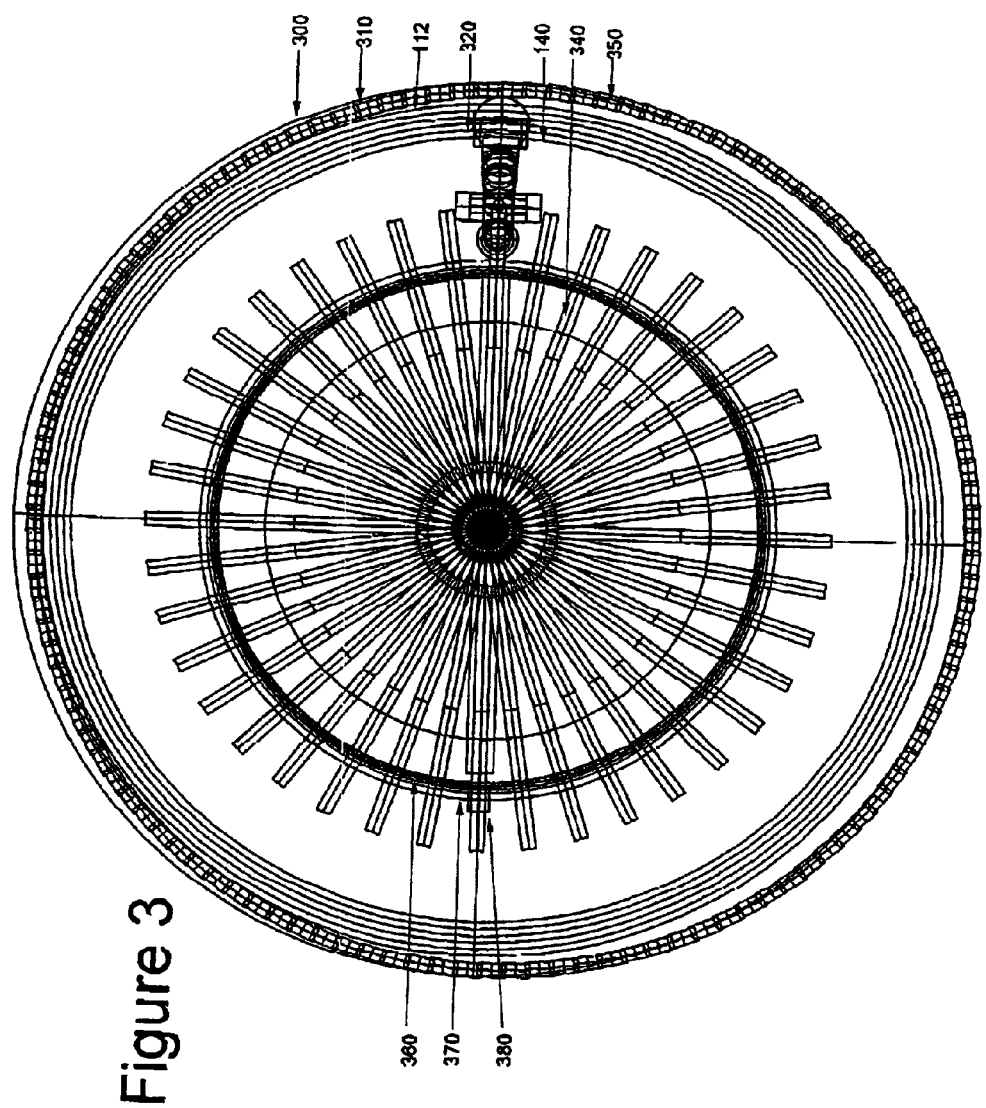
FIG. 3 is a bottom view of the tidal generator system according to an example embodiment of the present invention.

FIG. 3 shows a bottom view of the tidal generator system 100 according to an example embodiment of the present invention. Other embodiments and configurations are also within the scope of the present invention. More specifically, FIG. 3 shows an outer cover floatation ring 300 that encompasses a neodymium magnetic ring 310. The outer cover floatation ring 300 and the neodymium magnetic ring 310 may be provided outside the wall 112 of the containment tank 100. An inner magnetic non-corroding metal ring 320 may be provided inside the wall 112 of the containment tank 100. FIG. 3 also shows a location of the piston plate diaphragm 140. An inner neodymium magnetic ring 330 may help lift and lower the center of larger piston diaphragms. The tidal generator system 100 may also include a guide and centering post 340 such as for larger tidal generator systems, for example. FIG. 3 also shows an area 350 for the valve mechanism 150 and the permanent magnet turbine 160 (FIG. 2).

FIG. 3 also shows an inner structure 360 of the hydraulic stabilizer and leveler control (i.e., the self-stabilizing leveler system) and an outer structure 370 of the hydraulic stabilizer and leveler control. An outlet valve 380 may be provided for overflow of water, for example, from the stabilization control hydraulic system.

Figure 4:
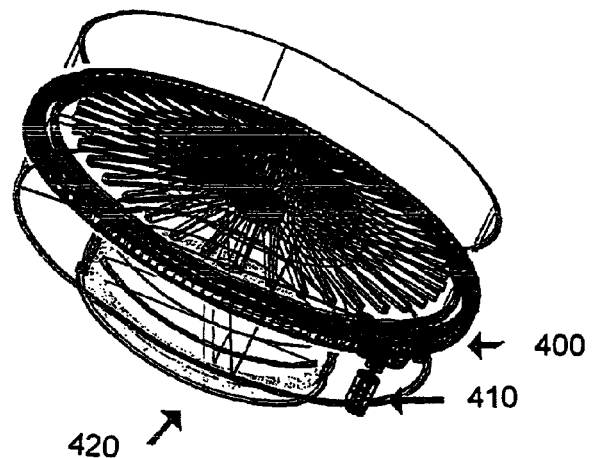
FIG. 4 is a side view of the tidal generator system according to an example embodiment of the present invention.
Figure 5:
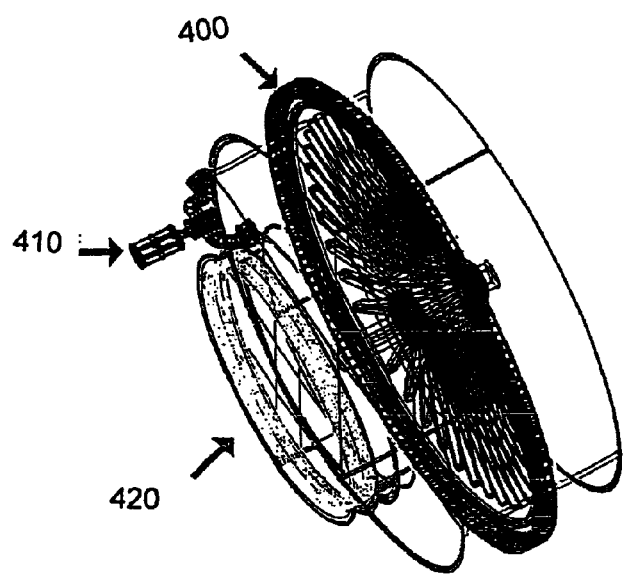
FIG. 5 is a side view of the tidal generator system according to an example embodiment of the present invention.

FIGS. 4 and 5 are each side views of the tidal generator system according to an example embodiment of the present invention. Other embodiments and configurations are also within the scope of the present invention. More specifically, FIG. 4 shows the tidal generator system 100 at a 45 degree forward tilt perspective and FIG. 5 shows the tidal generator system 100 at a 60 degree bottom perspective. Reference points 400, 410 and 420 are merely shown to show identical areas at different angles in each of the figures.

FIG. 6 is a close-up view of pumping, turbine and generator devices (or systems) according to an example embodiment of the present invention. Other embodiments and configurations are also within the scope of the present invention. More specifically, FIG. 6 shows an outflow point 502 of the tank 110 for water as the high tide begins to recede and an inflow point 504 for water to enter the tank 110 as the tide rises. A high-speed turbine system 506 may be provided within the inflow and outflow pipe system between the outflow point 502 and the inflow 504. A high-speed generator device 508 may be coupled to the turbine device 506. The water passing through the outflow point 502 and the inflow point 504 turns the turbine device 506, which in turn, turns the generator device 508 to create electrical energy.

FIG. 7 is a close-up view of the turbine device 506 according to an example embodiment of the present invention. Other embodiments and configurations are also within the scope of the present invention. More specifically, FIG. 7 shows a turbine design 600 that enables the turbine device to run (or turn) in only one direction regardless of the flow of water. The turbine device may include an outflow chamber 602 and an inflow chamber 604.

On the inside, the tidal generator system 100 may include the piston diaphragm plate 140. The piston diaphragm plate 140 may be extremely light weight but have high tensile strength with a metallic ring around an edge inside of a sealing membrane. The metallic ring may be influenced by the magnetic field preferably causing the piston diaphragm plate 140 to lower or raise on the inside of the containment tank 110, preferably creating a vacuum when the tide rises and thereby drawing water at high pressure through a transfer tube on the in-flow side 154 of the valve mechanism 150 and preferably pumping out the water when the tide ebbs through the outflow side 152. This activity, in turn, turns the turbine 160 that is designed to operate in one direction only but because the valves 602 and 604 preferably direct the water flow through the turbine 160 always rotating the turbine 160 in the same direction due to their construction.

The operation of the tidal generator system may require that the minimal low-tide-line be ascertained for proper operation. Because there is a difference in levels between the average low tide, the average high tide, the lowest low tide, and the highest high tide, the tidal generator intake may be placed at the low tide line so as to take advantage of the total maximum rise of the tide.

The self-stabilizing leveler system having the upper half 200, the lower half 210, the support coil 220 and the coil housing 230 may be an electronically activated, pneumatically operated device that uses digital tidal signal information in its area of operation to elevate or lower the containment tank 110 to the low tide level line 114, thus preferably placing the turbine intake assembly (including the in-flow side 154, the out-flow side 152 and the turbine 160) at the proper operational level. For example, the base of the tidal leveler positioner may be located on a pre-installed base at the lowest historical tidal level.

The signals that cause the pneumatic leveler system to assume the proper level to reach the working tide line 114 may be received from an official weather source, such as NOAA, that transmits the signals in such a manner that preferably the signal can be converted into a digital pulse that can activate the pumps that raise or lower the housing 230 or alternatively the level can be set manually by an operator having the information available from any one of a plurality of electronic media or documented information services.

The coils in the housing 230 may expand or contract raising or lowering the upper half 200 that supports the entire tank 110 placing the platform at the desired operational level.

Once the desired operational level is obtained reaching the level of the lower tidal mark 114, the rising tide may lift the floatation collar (or floatation ring), which in turn, cause the piston plate diaphragm 140 to rise creating a vacuum in the containment tank 110, that in turn draws tidal water through the in-flow side 154 of the turbine, and preferably the attached drive shaft drives the generator 165. The continual rise of the tide may continue to draw tidal water into the containment tank 110 until the tide reaches its peak or maximum level. The continuous drawing water into the containment tank 110 occurs through the turbine 160, thereby driving the generator 165.

At the maximum level, the opposite actions may occur. More specifically, as the floatation electromagnetic ring 170 begins to lower with the lowering tide, its weight may cause pressure to be applied to the piston plate diaphragm 140 in a downward direction, which in turn, forces the accumulated water in the containment tank 110 out through the out-flow side 152 and once again through the turbine 160 in turn driving the generator 165 till the tide ebbs.

Another embodiment of the tidal generator (hereafter a second tidal generator system) may be placed in a side-by-side installation with a first tidal generator system (such as described above). This embodiment may operate in a "delayed" manner with regard to the above-described first tidal generator system 100. As the tidal activity raises the floatation ring around the containment tanks of both systems in a like manner, the second tidal generator system may close the out flow side 154 as the tide rises, thereby creating a vacuum within its containment tank, but would not allow any tidal water to flow inward. The vacuum created would hold until such time as the high tide mark was reached, and then the valve would open and would preferably allow the water to rush into the containment tank of the second tidal generator system, thus creating delayed generation of electrical power while the tidal generator system reaches its high tide mark and begins to recede. When the second tidal generator system reaches its three quarter level, for example, the valve on the inflow side would be closed, containing the accumulated tidal water. It would open again as the tidal first tidal generator system once again reached its non-generating neutral point.

Embodiments of the present invention may provide a tidal generator that works on a vacuum and pressure principal. The generator may include a large round hollow cylinder whose thickness is the same as the difference between the minimal tide to the maximum tide. A baffle plate may be provided inside that rides a central shaft for stability. The baffle plate may be very thin 1/10th the thickness of the cylinder and be made of high density polycarbonate plastic with a stainless steel band all the way around its perimeter. The container material may be made of a UV resistant high density polycarbonate plastic material as well. The outside of the container may contain a floatation collar that rides up and down on the outside of the container as the tide moves in or out. The ring may contain a powerful series of permanent magnets encased in thin ceramic to eliminate oxide contamination. The movement causes the inside wafer to rise or fall as the magnetic ring follows the outside permanent magnets.

A turbine may be provided at the bottom side of the cylinder and be coupled to electronic valves that open when the tide begins to rise, and as the baffle begins to rise, it draws sea water through the valve opening into the turbine. The pressure may be multiplied by the area mass of the cylinder. The larger the cylinder, the greater the pressure through the turbine which is coupled to a direct drive generator.

When the tide has reached its peak, the valve may close on the intake side and switch the drive onto the opposite side of the turbine as the tide goes down, pushing the sea water in the opposite direction.

Additionally, a second additional unit may be made to work between the tidal cycles. This may incorporate a delay mechanism that inhibits its movement until the tide has reached either maximum or minimum. At this point, the electronic signal releases it to work. For example, it may start to rise from the residual level accumulated while the first unit reaches its apogee and then start down. As such, for a length of time (such as a few hours), both units may be generating power.

While the invention has been described with specific embodiments, the description of the specific embodiments is illustrative only and is not to be construed as limiting the scope of the invention. Various modifications and changes may occur to those skilled in the art, without departing from the spirit and the scope of the invention.

I claim:

1. A tidal generator system comprising:
   a containment tank;
   an outer magnetic ring provided about said containment tank to rise and fall based on tidal actions;
   a plate diaphragm provided within the containment tank with an inner magnetic ring around an edge of the plate diaphragm and along the containment tank wall to rise and fall by the force from said outer magnetic ring and to create a vacuum inside said containment tank;
   a valve mechanism attached to said tank that allows a liquid to pass into said containment tank and to pass out of said containment tank by the created vacuum; and
   a turbine/generator system to generate electrical energy based on the liquid passing through said valve mechanism.

2. The tidal generator system of claim 1, wherein when the outer magnetic ring rises, the plate diaphragm rises and creates the vacuum in the containment tank.

3. The tidal generator system of claim 2, wherein the vacuum draws the liquid through the valve mechanism such that the turbine/generator system generates the electrical energy.

4. The tidal generator system of claim 1, wherein when the outer magnetic ring lowers, the plate diaphragm lowers which forces accumulated liquid in the containment tank out through the valve mechanism such that the turbine/generator system generates the electrical energy.

5. The tidal generator system of claim 1, wherein the turbine/generator system includes a turbine device to turn based on the liquid passing through the valve mechanism.

6. The tidal generator system of claim 5, wherein the turbine/generator system further includes a generator device coupled to the turbine device to generate the electrical energy based on actions of the turbine device.

7. The tidal generator system of claim 1, further comprising a leveler system to adjust a position of the tidal generator system to a desired operational level.

8. The tidal generator system of claim 1, further comprising a delay mechanism to delay certain operations from tidal actions.

9. A tidal generator system comprising:
   a containment tank;
   an outer magnetic ring provided outside the containment tank;
   a plate diaphragm provided in the containment tank with inner magnetic ring to rise or fall based on movement of the outer magnetic ring force outside the tank, and to create a vacuum inside the containment tank;
   a valve system attached to the tank to pass water based at least on tidal actions and by the created vacuum; and
   a turbine/generator system to generate electrical energy based on the water passing through said valve system.

10. The tidal generator system of claim 9, wherein when the outer magnetic ring rises, the plate diaphragm rises and creates vacuum in the containment tank.

11. The tidal generator system of claim 10, wherein the vacuum draws the water through the valve system such tat the turbine/generator system generates the electrical energy.

12. The tidal generator system of claim 9, wherein when the outer magnetic ring lowers, the plate diaphragm lowers witch forces water in the containment tank out through the valve system such that the turbine/generator system generates the electrical energy.

13. The tidal generator system of claim 9, wherein the turbine/generator system includes a turbine device to turn based on the water passing through the valve system.

14. The tidal generator system of claim 13, wherein the turbine/generator system further includes a generator device coupled to the turbine device to generate the electrical energy based on actions of the turbine device.

15. The tidal generator system of claim 9, further comprising a leveler system to adjust a position of the tidal generator system to a desired operational level.

16. The tidal generator system of claim 9, further comprising a delay mechanism to delay certain operations from tidal actions.

17. A method of generating electrical energy comprising:
   moving an outer magnetic ring about a containment tank based on tidal actions of water;
   moving a diaphragm with an inner magneticing within the containment tank by the movement of the outer magnetic ring and creating a vacuum inside the containment tank;
   allowing water to pass through a valve system attached to the tank based on movement of the diaphragm; and
   generating electrical energy based on the water passing through the valve system.

18. The method of claim 17, wherein when the outer magnetic ring moves up, the vacuum passes the water into the containment tank.

19. The method of claim 18, wherein when the outer magnetic moves down, the water in the containment tank passes out through the valve system.

* * * * *